(12) United States Patent
Löbig et al.

(10) Patent No.: US 7,961,597 B2
(45) Date of Patent: Jun. 14, 2011

(54) METHOD AND DEVICE FOR AUTOMATICALLY CONFIGURING A VIRTUAL SWITCHING SYSTEM

(75) Inventors: Norbert Löbig, Darmstadt (DE); Jürgen Tegeler, Penzberg (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 24 days.

(21) Appl. No.: 12/095,581

(22) PCT Filed: Aug. 24, 2006

(86) PCT No.: PCT/EP2006/065612
§ 371 (c)(1),
(2), (4) Date: Jul. 20, 2009

(87) PCT Pub. No.: WO2007/062884
PCT Pub. Date: Jun. 7, 2007

(65) Prior Publication Data
US 2009/0268608 A1    Oct. 29, 2009

(30) Foreign Application Priority Data

Nov. 30, 2005  (DE) .......................... 10 2005 057 099

(51) Int. Cl.
*H04J 1/00* (2006.01)
(52) U.S. Cl. .......................... 370/218; 370/392; 370/398

(58) Field of Classification Search .......... 370/216–228, 370/360, 389, 392, 398, 399; 714/1–4
See application file for complete search history.

(56) References Cited

U.S. PATENT DOCUMENTS

| | | | |
|---|---|---|---|
| 6,654,369 B1 * | 11/2003 | Pelisster et al. | 370/389 |
| 6,842,513 B1 * | 1/2005 | Androski et al. | 370/352 |
| 2002/0122547 A1 | 9/2002 | Hinchey et al. | |
| 2004/0042469 A1 | 3/2004 | Clark et al. | |

FOREIGN PATENT DOCUMENTS
WO    WO 03/092225    11/2003

* cited by examiner

*Primary Examiner* — Ricky Ngo
*Assistant Examiner* — Pao Sinkantarakorn
(74) *Attorney, Agent, or Firm* — Laurence A. Greenberg; Werner H. Stemer; Ralph E. Locher (57) ABSTRACT

The invention relates to a plurality of common switching systems which are interconnected in order to form a virtual switching system. The number of the internal switching system is entered into the numbering of the port of the virtual switching system thus making a standardized user interface of the switching system become available. The port can be managed by a user in a traditional manner. The virtual switching system can be automatically configured due to said type of configuration when a central entity for developing the internal routing on the partial system is introduced, and then, optional geographical redundancy of the virtual switching system is possible.

16 Claims, 7 Drawing Sheets

METHOD AND DEVICE FOR AUTOMATICALLY CONFIGURING A VIRTUAL SWITCHING SYSTEM

CLAIM FOR PRIORITY

This application is a national stage application of PCT/EP2006/065612, filed Aug. 24, 2006, which claims the benefit of priority to German Application No. 10 2005 057 099.2, filed Nov. 30, 2005, the contents of which hereby incorporated by reference.

TECHNICAL FIELD OF THE INVENTION

The invention relates to a method a device for automatically configuring a virtual switching system.

BACKGROUND OF THE INVENTION

More recent communication architectures provide for call-processing networks to be separated into connection-service-related units and the transport of useful information (bearer control). This results in separation of connection setup and bearer setup. For communication traffic, such a concept means that there is no longer a strong tie to the network topology. In addition, network consolidation, that is to say the replacement of smaller and possibly outmoded switching centers with conventional concentrators and access networks or with access gateways connected on a packet basis, results in the need to control a large subscriber and connecting-line peripheral area using a single switching node. This means that demands for ever larger switching centers/call servers are becoming increasingly significant. Examples of these are demands for one million subscribers to be able to be served by a single conventional switching center or by an IP-based call feature server.

However, the switching centers, call servers or media gateway controllers which exist at present are designed for a particular maximum peripheral area. This is determined, inter alia, by the command masks of the machine language, the data stores of central and peripheral devices, the performance of these subsystems and the capacity of the intercommunication between these units. In addition, the expansion stages for these switching centers are operated significantly below the maximum expansion from the viewpoint of cost, since this is the only way of ensuring optimized costs. (The lowest costs are meant to be where the most frequent expansion size, on average, is located). This allows the system boundaries to be increased generally only by providing considerable development expense. This aspect is also intensified by the high level of complexity of the switching systems, which is caused, inter alia, by the fact that a large number of call-processing features are provided at the same time as almost total failsafety and maximum system availability. From the point of view of limited development budgets and rapid product availability, alternative solutions are therefore becoming more significant.

In the prior art, the peripheral area is subdivided and tied to various switching nodes, which are themselves meshed among one another or via interposed further switching nodes. This has the associated drawback that the network structure is artificial and requires high levels of administration expense. In addition, in the case of #7 signaling, unwanted additional point codes for the internal addressing are required which need to be taken into account in the external remote systems. Finally, from the point of view of the user, not just one switching center needs to be operated/administered but rather a plurality of switching centers in a given network.

SUMMARY OF THE INVENTION

In the invention, the use of functions and components (hardware and software) of a conventional switching system/call feature server means that the peripheral area size of the resultant virtual switching system is far above that of the initial system. In particular, this has low associated development expense. In return, the costs per port of the extended system are calculably higher, but for that no greater than twice the costs per port in the initial system.

Reuse of the functions and components (hardware and software) of a conventional switching system/call feature server is made possible by interconnecting a plurality of switching centers with standard operator control by extending the physical position of a port with an index for the switching center. In addition, a destination address assessment functionality for reducing the internal switching centers involved in a call to no more than two is provided. When #7 signaling can be used, an internal STP (Signaling Transfer Point) for providing a standard external point code is provided. To assist effective internal communication, the STP function may be extended by suitable signaling protocols, e.g. BICC termination and SIP termination, and may comprise the destination address assessment functionality. Particularly in the absence of #7 signaling, the destination address assessment functionality is implemented in a dedicated internal routing server (IRS) which is able to intercommunicate with the internal switching systems using suitable signaling protocols. One possible such protocol is SIP, in particular.

Internal routing and destination address/digit assessment are performed by STP or IRS, including inline learning of the current routing. The latter is effected by means of safe and simplified administration and by self-learning routing algorithms in the allocated STP or IRS component. The introduction of a centrally controlled TDM switch or indirectly centrally controlled IP/IP gateway for bearer handling likewise allows the TDM case to be handled.

Finally, a configuration of this kind allows optional geographical redundancy to be supported. In terms of the connected subscriber/connecting lines, this virtual switching system is presented to the operator as a single switching system, since the user interface of a single switching node is provided. In addition, the system has a single point code for #7-based signaling to the outside, and equally the system has preferably a single IP address or, for redundancy reasons, at most two IP addresses in the direction of a respective remote unit for the IP-based signaling protocols H.248, SIP, MGCP, H.323, SCTP/IUA/V5UA etc.

BRIEF DESCRIPTION OF THE DRAWINGS

The invention is explained in more detail below with reference to an exemplary embodiment which is illustrated in the drawing, in which.

DETAILED DESCRIPTION OF THE INVENTION

Figure 1:
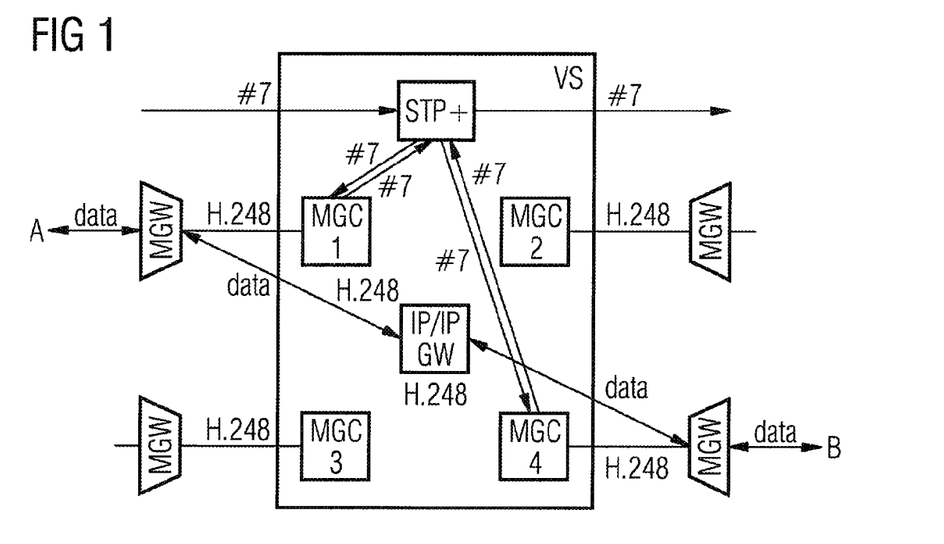
FIG. 1 shows a #7-#7 call using an STP and an IP/IP gateway.

FIG. 1 shows a #7-#7 call using an STP and an IP/IP gateway in accordance with an embodiment of the invention. Accordingly, a total of n conventional switching systems are provided. These are in the form of media gateway controllers MGC (connection of inter-exchange lines) or in the form of call feature servers (connection of subscribers). The invention provides for n=4 conventional switching systems MGC1 . . . MGC4 to be interconnected to form a single virtual switching system VS. In this case, the number 4 can be regarded as exemplary, n being able to be any desired natural number, in principle. Each of the four switching systems MGC serves part of the peripheral area of the virtual switching system VS. This means that the peripheral area of the virtual switching system VS is equal to the sum of the peripheral areas of the conventional switching systems MGC1 . . . MGC4. In this context, the peripheral area may be in the form of a conventional subscriber line peripheral area or inter-exchange line peripheral area, with the useful data being routed to the switching system using TDM technology, or in the form of an IP-based peripheral area, in which the peripheral area does not necessarily route the useful data stream via the switching system, but rather routes it to the respective remote communication party, or receives it from the respective remote communication party, preferably directly and likewise on an IP basis.

When a TDM peripheral area is present, the signaling is preferably in the form of standardized subscriber signaling or inter-exchange signaling, such as V5 signaling or #7 signaling.

When an IP peripheral area is present, the signaling is preferably in the form of standardized signaling, such as using H.248, H.323, MGCP, SIP and/or SCTP/IUA/V5UA. The use of other, including proprietary, signaling protocols is likewise possible.

Every conventional switching system MGC comprises peripheral units and central units which intercommunicate via a message distribution system. The message distribution system is optionally extended such that intercommunication is possible particularly between the peripheral devices of two arbitrary switching systems from the set of four conventional switching systems. Every port in the virtual switching system VS is in each case exactly one port in a single one of the four switching systems MGC.

An A-end call is explicitly allocated to one of the four conventional switching centers by means of the V5 interface in the case of V5 signaling and by connecting the TDM trunk to be engaged to the switching center or an upstream gateway in the case of #7 signaling. In the case of MGCP- or H.248-based subscriber signaling, the switching center MGC engaged at the A end from the set of four switching centers is likewise determined explicitly. The same applies to ISDN signaling routed via IUA signaling or to V5.2 control transmitted via IP signaling (V5UA).

The A-end call involves digit assessment or destination address assessment and also a routing decision being made in the A-end switching center MGC. If the B-end destination finds itself to be a subscriber or external connecting line for the switching center which is active for this call at the A end then conventional processing is carried out by this switching center. The further n–1 (that is to say 3) switching centers in the virtual switching system VS are not involved in the handling of the call.

If this case does not arise and the destination subscriber or the desired external connecting line is associated with the peripheral area of one of the other three switching systems, default routing takes place in the A-end switching system. The associated signaling is forwarded by means of #7 signaling to an internal STP (Signaling Transfer Point) with destination address functionality (STP+) or via SIP protocol to an internal routing server (IRS). The STP+ or IRS makes a digit assessment or destination address assessment and allocates the internal call from the virtual switching center VS to precisely one of the remaining three switching centers MGC at the B end.

If an STP server is used (FIG. 1-FIG. 6), it relays the signaling between the A- and B-end switching centers MGC of the virtual switching center VS. If an SIP-based IRS is used (FIG. 7-FIG. 10), the signaling relationship is redirected such that from that point onward the A-end and B-end switching centers communicate directly with one another until the end of the call.

The routing decision can a priori be made deterministically, which requires appropriate administration in the STP+ or IRS. In line with the invention, it is likewise possible, in particular, for concurrently learning digit assessment or destination address assessment to take place as an option. To this end, a switching center which is presumedly competent at the B end is determined algorithmically and the success of the allocation is monitored by the fresh default routing of a switching center incorrectly allocated as a switching center which is competent at the B end. To check the success of the optional method, an internal call ID which is explicit in the virtual switching system is added to the signaling information. In addition, an internal hop counter can also be carried.

In the optional method, the failure of internal engagement of one of the n–1 (that is to say 3) switching systems is disclosed explicitly with a reject message or implicitly with timer expiry. This results in fresh engagement of the STP+ or of the IRS by the A-end internal switching center. When the SIP protocol is used, the same call is repeatedly redirected to the IRS by the A-end switching center on the basis of the explicit or implicit reaction of the incorrectly engaged switching center. If the STP+or IRS recognizes the self-induced misallocation of the B-end internal switching center from the carried call ID, which is explicit in the virtual switching center VS, then it corrects its allocation algorithm accordingly and makes a repeat attempt if the hop counter still so permits. The STP+ or IRS or else every internal switching system MGC can possibly make a trigger decision on the basis of the hop counter threshold value being reached. The deterministic administrative allocation method may likewise be combined with the optional B-end allocation method. It is thus possible for certain allocations to be administratively stipulated and maintained, and it is likewise possible for others to involve the self-learning approach.

The useful data stream on a connection handled via IRS between the A- and B-end internal switching centers is not switched until the two A- and B-end signaling parties have been determined. If the A end or B end is connected directly via TDM, an IP conversion is performed by the interposed media gateway MGW at the A and/or B end under the autarkic control of the A-end or B-end switching center.

The useful data stream from a virtual switching center controlled by internal #7 signaling can be routed to a pure TDM switch whose TDM terminations can be addressed using internal CICs (Circuit Identification Codes). Once the internal STP of the virtual switching system has successfully determined the internal B-end system, there is a connection via this TDM switch, said connection having been set under the control of the internal STP+ and engaging two internal CICs on this TDM switch for the duration of the call. If the A end or B end is connected directly via TDM, the aforementioned IP conversion by the interposed MG at the A and/or B end under the control of the A-end or B-end switching center is therefore not necessary.

As an alternative to the TDM switch, it is also possible to use an IP-IP gateway in the case of the internal #7 signaling (FIG. 1-FIG. 3), which gateway is controlled using an MGCP or H.248 protocol, for example. In this context, the gateway is engaged at the A end by the A-end internal switching center, and the gateway is engaged at the B end by the B-end internal switching center. The internal STP+ ensures that the A and B ends engage the gateway using suitable CICs, which allow the IP-IP gateway to recognize the two incoming calls as being associated with one another. If the A end or B end is connected directly via TDM, IP conversion is again performed by an interposed media gateway MGW at the A and/or B end under the autarkic control of the A-end or B-end switching center. One optimization option is provided by the presence of the IP-IP GW and TDM switch for internal #7 signaling, which is characterized in that avoidable dual IP TDM conversion does not take place within a call.

To allow standard operator control of the virtual switching system, a user interface dedicated to a single switching system is provided. This means that the numbering of a port in the virtual switching system incorporates the number of the internal switching system too. It is therefore possible for the user to manage a port in the manner to which he is accustomed. The subsequent administration of the internal switching system in question is therefore a matter for the management system. The management of routes for the instance of the deterministic method or alternative routes for the instance of the optional method is supported by the management system such that the internal systems involved, including STP+ or IRS, are automatically supplied with the routing information. Charge tickets are respectively generated separately in the maximum of two internal switching centers. A correlation is made, by way of example, using the internal call ID, telephone numbers involved and time stamps etc. as part of a post processing component of the method.

Statistics, load indicators etc. are detected locally per internal switching system, but are made available to the user in standard fashion by the management system. In addition, management applications for simplified subscriber and #7 administration are adapted to the situation of the virtual switching system in order to give the user the impression of a standard switching system.

An optional rise in the performance of the virtual switching system is obtained through direct routing of the call-processing messages from the A-end peripheral unit of the A-end internal switching center to the B-end peripheral unit of the B-end switching center, provided that the B-end peripheral device of the A-end switching center and the A-end peripheral device of the B-end switching center do not require this information (e.g. STP descriptions for terminals).

FIG. 1 shows the connection of a call incoming on the internal switching system MGC1 via a connecting line using #7 signaling. The call's destination is a connecting line under the control of MGC4, which likewise uses #7 for signaling. Since MGC1 is not competent for the destination, the call is forwarded to the address assessment function of the STP+. This finds MGC4 to be competent for the destination and engages MGC4. #7 signaling to be transferred passes through the STP+, since this provides the standard point code of the virtual switching system. The useful data stream is routed via an IP/IP GW. Referenced CICs in the direction of MGC1 and MGC4 are correlated and are allocated by STP+ such that the IP/IP GW can connect the useful data as required bidirectionally.

Figure 2:
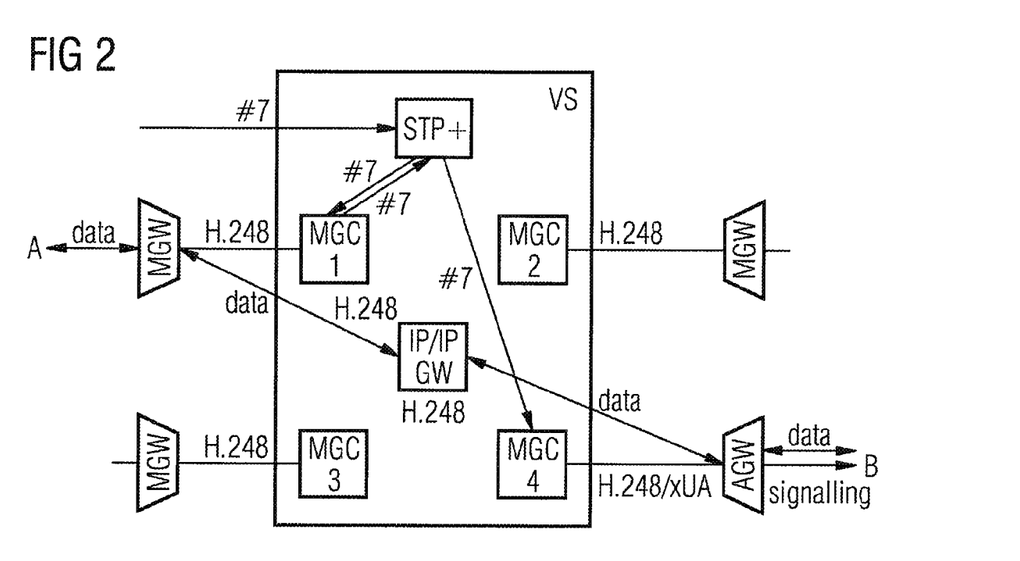
FIG. 2 shows a #7-subscriber call using an STP and an IP/IP gateway.

FIG. 2 shows the conditions in FIG. 1 with the difference that the destination is a subscriber served by MGC4 downstream of an access gateway. There is therefore no longer any need for the #7 signaling in the direction of the B end. The address assessment function continues to be implemented in the STP+. The internal signaling is effected using #7. The useful data are routed via the IP/IP gateway using suitable CICs.

Figure 3:
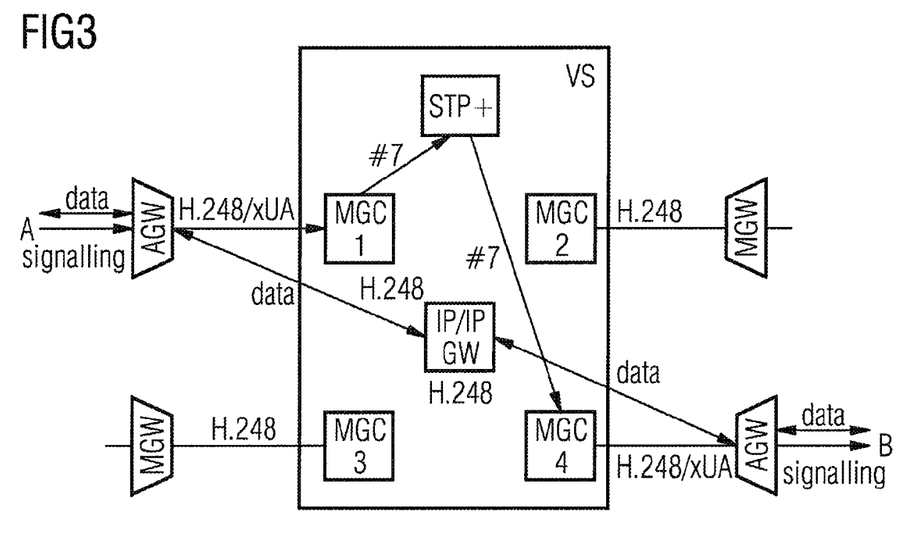
FIG. 3 shows a subscriber-subscriber call using an STP and an IP/IP gateway.

FIG. 3 shows the conditions in FIG. 2 with the difference that the origin of the call is an MGC1 subscriber connected downstream of an access gateway. The external #7 signaling therefore disappears completely. The address assessment function continues to be implemented in the STP+. The internal signaling is effected using #7. The useful data are routed via the IP/IP gateway using suitable CICs.

Figure 4:
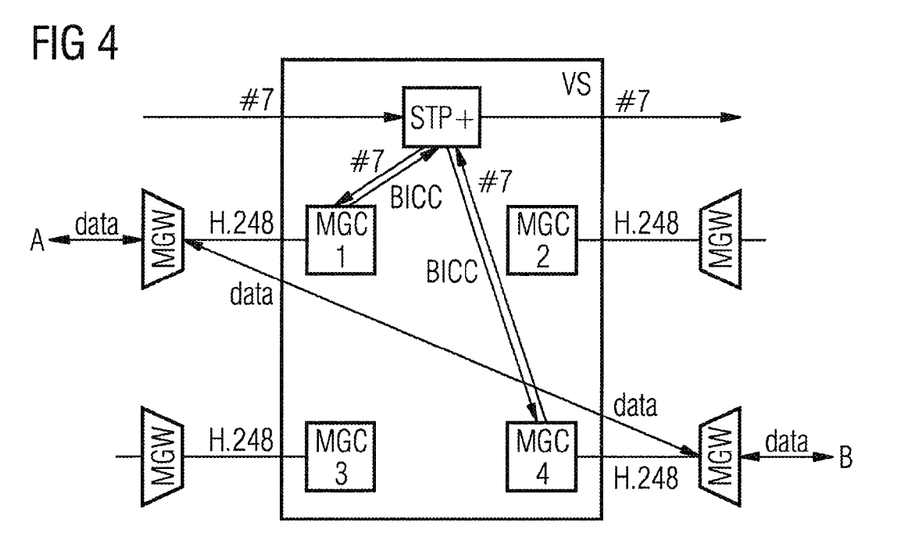
FIG. 4 shows a #7-#7 call using an STP without an IP/IP gateway.
Figure 5:
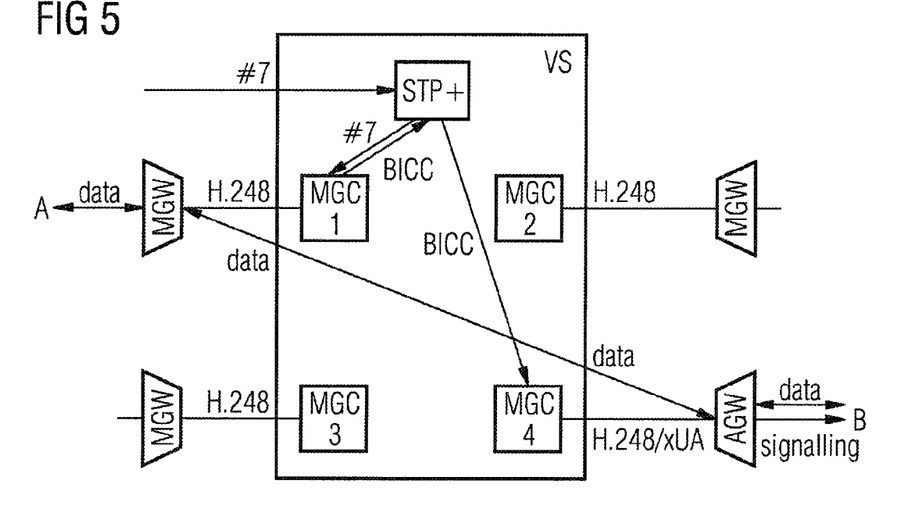
FIG. 5 shows a #7-subscriber call using an STP without an IP/IP gateway.
Figure 6:
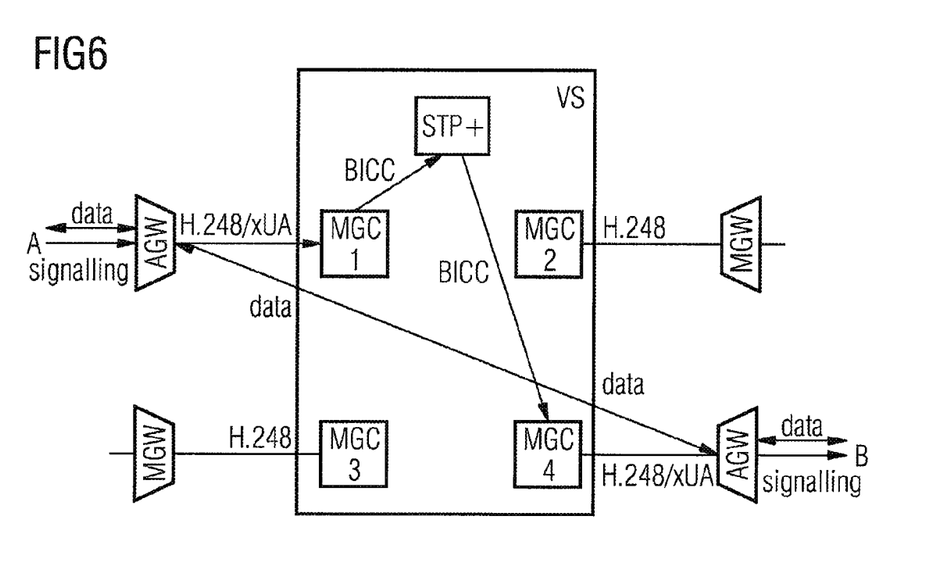
FIG. 6 shows a subscriber-subscriber call using an STP without an IP/IP gateway.

FIGS. 4-6 show the conditions in FIGS. 1-3 with the difference that BICC is used as internal signaling. This eliminates the need to add an IP/IP gateway in the useful data stream.

Figure 7:
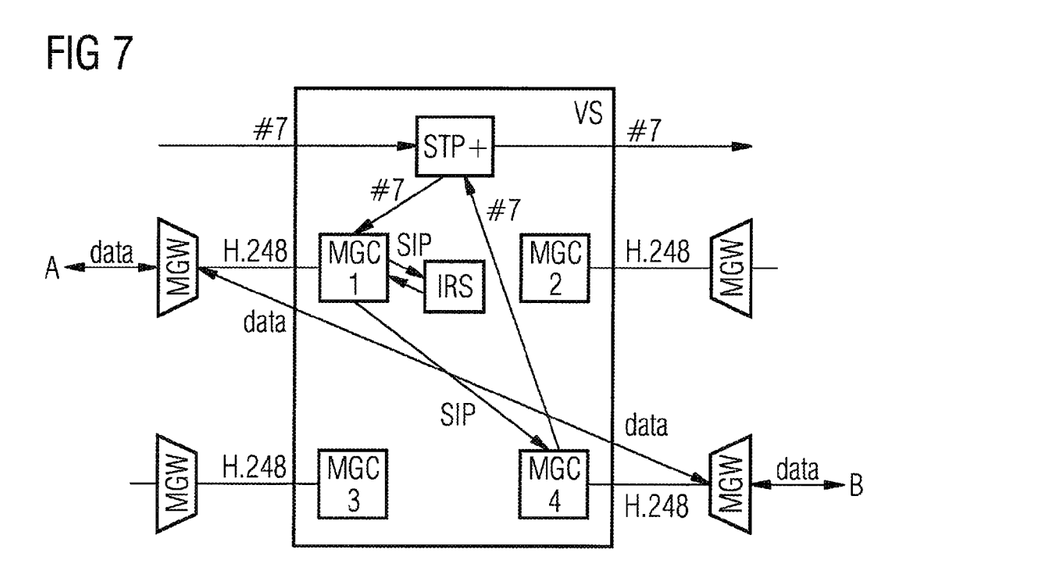
FIG. 7 shows a #7-#7 call using an STP without an IP/IP gateway and with an internal SIP protocol.

FIG. 7 shows the release of the address assessment function from the STP+ to a dedicated internal routing server (IRS) which uses the signaling protocol SIP. The internal switching systems MGC1-MGC4 communicate internally with the address assessment function using SIP. STP+ now plays a part only for external calls with #7 signaling. Following interrogation of the IRS, MGC1 is capable of forwarding the illustrated call coming from a #7 controlled A-end connecting line to MGC4 in order to engage a B-end connecting line using #7 signaling. The associated useful data stream is in this context routed directly between the A-end and B-end media gateways.

Figure 8:
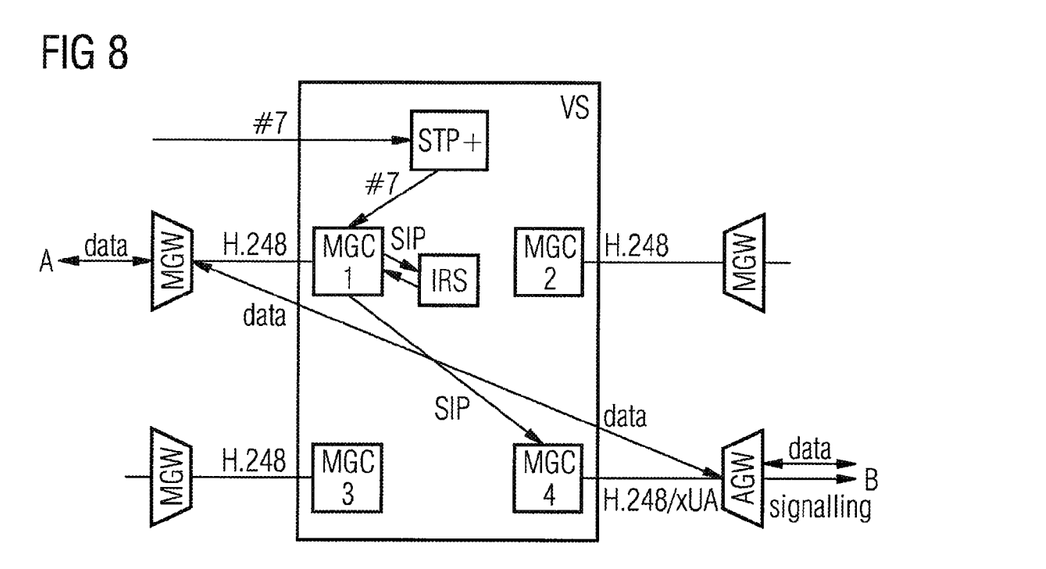
FIG. 8 shows a #7-subscriber call using an STP without an IP/IP gateway and with an internal SIP protocol.

FIG. 8 shows the conditions in FIG. 7 with the difference that the destination is a subscriber served by MGC4 downstream of an access gateway. There is therefore no longer any need for the #7 signaling in the direction of the B end. The address assessment function continues to be implemented in the IRS. The internal signaling is effected using SIP. Redirection takes place via SIP. In this context, the associated useful data stream is routed directly between the A-end media gateway and the B-end access gateway.

Figure 9:
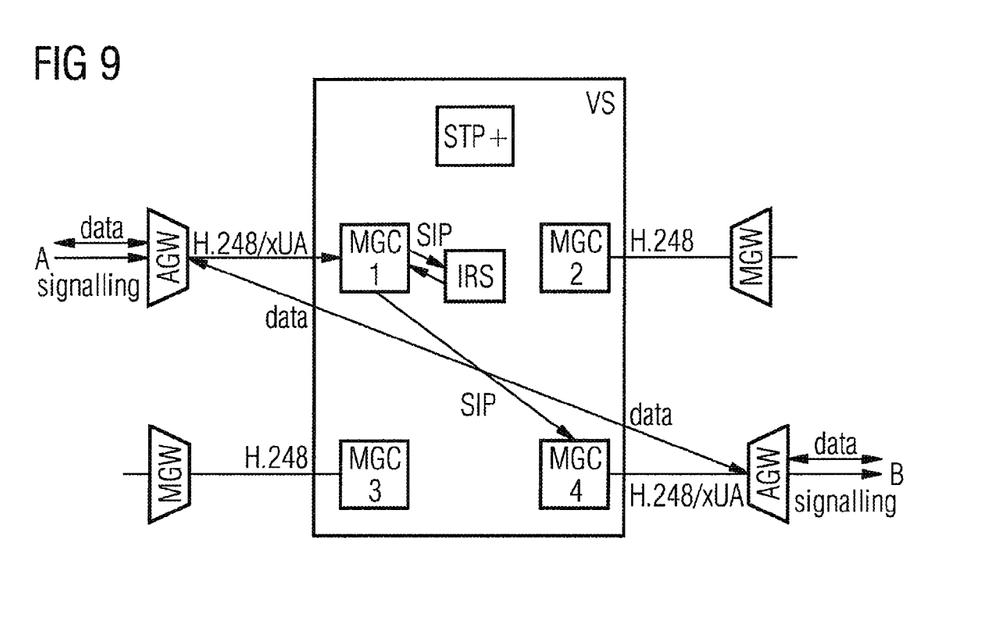
FIG. 9 shows a subscriber-subscriber call using an STP without an IP/IP gateway and with an internal SIP protocol.

FIG. 9 shows the conditions in FIG. 8 with the difference that the origin of the call is an MGC1 subscriber connected downstream of an access gateway. There is therefore no longer any need for the #7 signaling in the direction of the A end. The address assessment function continues to be implemented in the IRS. The internal signaling is effected using SIP. Redirection takes place via SIP. In this context, the associated useful data stream is routed directly between the A-end and the B-end access gateway.

Figure 10:
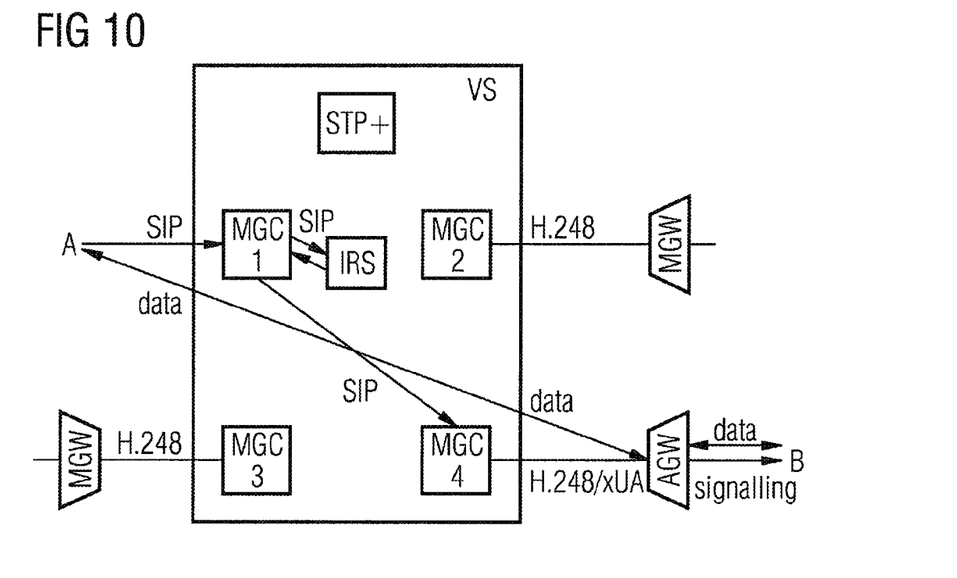
FIG. 10 shows an SIP-subscriber call using an STP without an IP/IP gateway and with an internal SIP protocol.

FIG. 10 shows the conditions in FIG. 9 with the difference that the A-end subscriber is an SIP-based subscriber served by MGC1. There is therefore no longer any need for the #7 signaling in the direction of the A end and the B end. The address assessment function continues to be implemented in the IRS. The internal signaling is effected using SIP. Redirection takes place via SIP. In this context, the associated useful data stream is routed directly between the A-end subscriber and the B-end access gateway.

To optionally support geographical redundancy for the individual switching systems (FIG. 11-FIG. 13), the IRS has the network's additional topology information which is required for geographical redundancy. This means that every subscriber/trunk on the virtual switching system can be served by at least two switching centers known a priori in the virtual system. By administration, the IRS is provided with knowledge of what alternative routings there are in the virtual switching system VS on the basis of the geographical redundancy.

Figure 11:
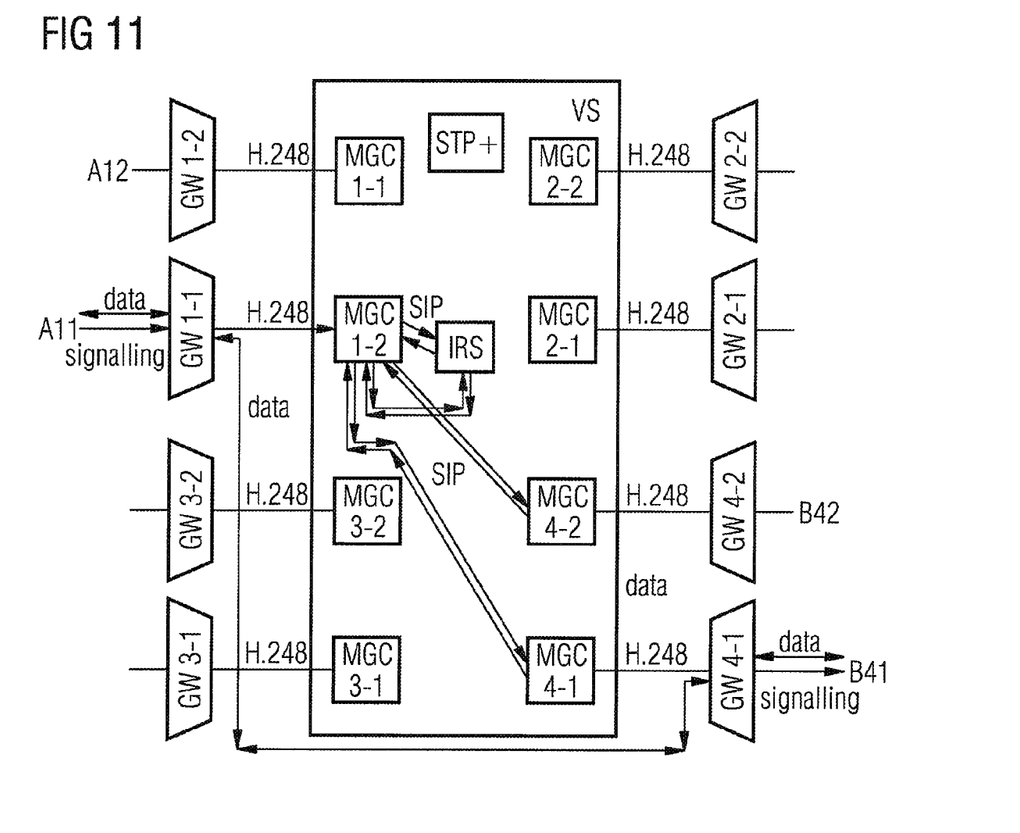
FIG. 11 shows a multiple SIP redirect for geographical redundancy in the virtual switching system.
Figure 12:
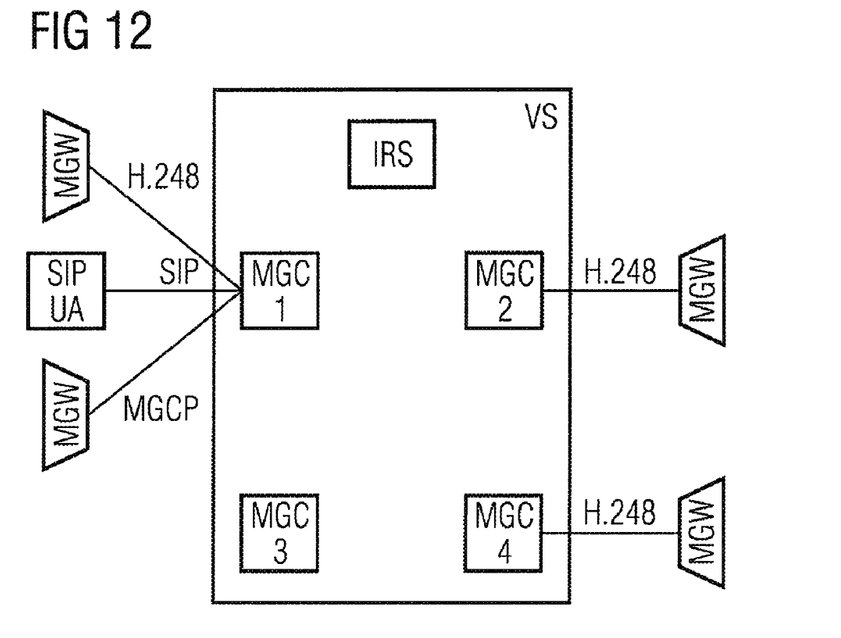
FIG. 12 shows a communication party in a VSx in normal mode.
Figure 13:
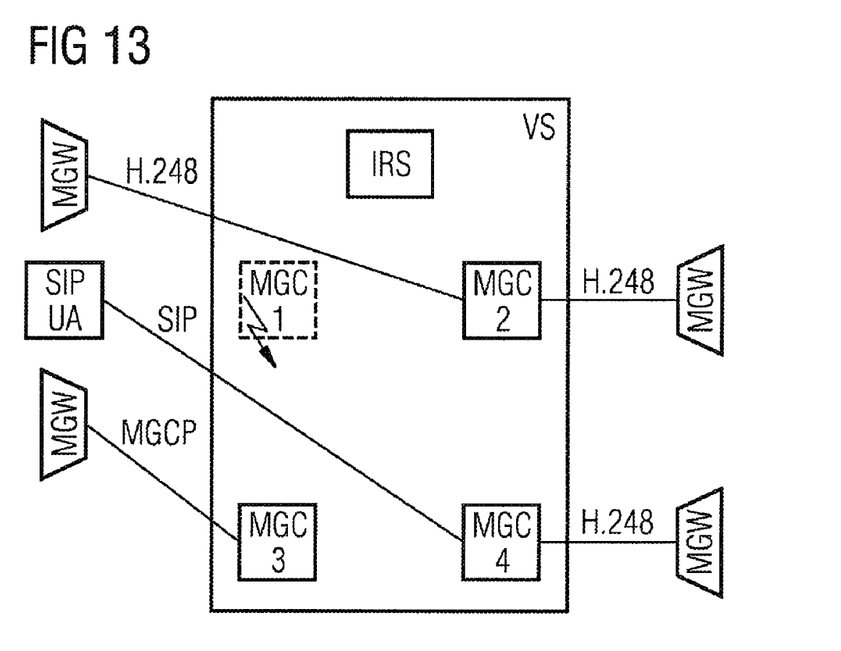
FIG. 13 shows a communication party in a VSx in standby mode.

The IRS also knows the way in which the geographical redundancy of the subsystems of the virtual switching system works. In particular, the IRS knows whether a switching system is geographically in the 1:1 ACT/STB mode (one switching system active, one switching system completely on standby) or in the 1:1 load sharing mode (two internal switching systems serve one peripheral area in normal mode on the basis of half each, in standby mode an internal switching system is already capable of serving the entire peripheral area).

If it is not possible to handle an A-end call locally in a switching system of the geographically redundant virtual switching system, the routing goes to the IRS. This finds the competent logical switching system on the basis of the destination address assessment, but does not initially know which of the geographically redundant switching systems is competent, allocates one of the two possibilities and records this in its concurrently learning database. If the IRS allocates the wrong geographical party, the A-end switching system approaches the IRS with the same call yet again. The IRS then updates its database and allocates the geographically redundant party. If there is then another repeat request from the A-end switching system for the same call, both geographically redundant B-end switching systems are obviously not available and the call can be initiated by the IRS possibly for safety reasons after a further allocation attempt. If the switching center allocated by IRS for a call to a B-end switching center does not receive an acknowledgement or receives a rejection, the IRS is engaged again by the A-end switching center for the present call. The IRS's database concurrently learning on the basis of the optional method can therefore likewise be updated. If geographical load sharing involves a B-end call for a port to be served by the geographical redundant switching center, the IRS is always engaged, which then redirects to the geographical party and in so doing adjusts its learning database according to the current allocation. In particular, the learning effect in the IRS which is achieved by means of a single call or a few calls can be used to update the allocation of entire groups of subscribers and connecting lines using the topology information about the type of geographical redundancy. If standby connection thus occurs on the basis of geographical redundancy, the IRS will have to make only a few misallocations in order to recognize the current interconnection state and then to allocate the respective correct B-end internal switching center without further misallocations.

The configurations shown in FIGS. 1 to 10 can therefore be used to provide geographical redundancy. The corresponding conditions are shown in FIGS. 11 to 13. These are described below with reference to the n=4 switching systems MGC1 . . . MGC4 of the virtual switching system:

First of all, it is assumed that the switching systems MGC are each geographically redundant in pairs. If this is not the case and if a subset of the four switching systems MGC1 . . . MGC4 is situated at the same location, for example, then the following consideration can nevertheless be applied to this subset. The paired geographical separation is thus not a restriction of the general case. The signaling parties of any of the interconnected switching systems MGC1 . . . MGC4 must be able to continue communicating with another of the interconnected units seamlessly or approximately seamlessly in the event of failure of one of the four switching systems MGC1 . . . MGC4. These signaling parties may be peripheral elements of the switching systems MGC1 . . . MGC4 (e.g. media gateways or access gateways) or else remote nodes (e.g. SIP proxies). The protocols which need to be considered here are primarily the SIP, H.323, H.248 and MGCP protocols. They may alternatively be proprietary protocols.

The problem of seamless standby connection is solved using the following approach:

In this context, it is assumed that a switching system MGCx is assigned k communication parties. All n switching systems of the virtual switching system now administrate a "shadow database", apart from the database which is in operation normally, but this shadow database is not active at first. The shadow database prompts every communication party in a switching system MGCx to be administrated at least on a further platform in a switching system MGCy of the virtual switching system. This applies to all n switching systems of the virtual switching system. The shadow database is the sum of these dual administrations. It is therefore possible for every communication party in any switching system MGCx to make contact with another (predefined) switching system of the virtual switching system if the communication link to the switching system MGCx has a fault. This is prior art in the standardized protocols SIP, H.323, H.248 and MGCP. For proprietary protocols, it is a simple matter to implement a corresponding mechanism (if not present).

In this context, it is advantageous if the communication parties in each switching system MGCx are distributed within the shadow database as evenly as possible over the n−1 remaining switching systems. If the switching system MGCx now fails, this is recognized by every communication party in the switching system MGCx. Contact can then be made with the respective predefined standby platform MGCy. If subscribers and connecting lines in the switching system MGCx can be distributed as evenly as possible over the remaining n−1 switching systems of the virtual switching system in terms of traffic load when said switching system fails, the capacity which needs to be reserved for this standby situation in the switching systems can be optimally small. This allows much more favorable redundancy schemes than 1+1 redundancy to be achieved. In the best case, n+1 redundancy will be obtained, which meets the condition that single failure of any switching system MGCx results in complete standby connection to the remaining switching systems.

This concept allows considerable hardware costs to be saved in comparison with 1+1 redundancy.

When the switching system MGCx has failed, the allocated communication parties thus register with the remaining switching systems MGCk (k/=x) according to the distribution provided by means of the topology information. The associated data information relating to subscribers and connecting lines is managed as a shadow database in the respective internal switching systems. In total, this means that every subscriber and every connecting line is administrated in precisely two geographically redundant internal switching centers MGCi. The availability of subscribers or connecting lines via an internal switching system MGC is prompted by the in-service configuration of the associated access gateways and media gateways. In particular, the case of complete geographical 1:1 redundancy is also covered.

FIG. 11 shows a virtual switching system made up of four respective completely 1:1 redundant internal switching systems MGC. The call arriving via gateway GW 1-1 is delivered to the MGC 1-1, since the GW 1-1 is currently being served by MGC 1-1. Since the B-end address is not served by the MGC 1-1, MGC 1-1 turns to the IRS. This refers MGC 1-1 to MGC 4-2, since the destination B41 can be reached via gateway GW 4-1 and this has previously been served by MGC 4-2. This results in the MGC 4-2 being engaged by MGC 1-1. Timer expiry or explicit rejection by MGC 4-2 means that MGC 1-1 must now repeatedly confront the IRS with the call. The IRS recognizes that it has made a misallocation and infers the case of geographical redundancy from this. This means that it refers MGC 1-1 to MGC 4-1, which now serves the gateway GW 4-1. The call is thus finally also connected successfully. IRS learns the new allocation. It infers for the case of complete 1:1 redundancy that all subscribers and lines on MGC 4-x can now be reached via the internal switching system MGC 4-1.

FIGS. 12 and 13 shows the case of flexible allocation, in which the peripheral area connected to the MGC 1 is distributed over the remaining internal switching systems in the standby case. If MGC 1 fails, the H.248 controlled media gateway is served by MGC 2, the SIP user agent is served by MGC 4 and the MGCP controlled media gateway is served by MGC 3. The IRS knows the associated topology information for this geographical redundancy scheme. In particular, it knows that the H.248 MGW on MGC1 can also be controlled by MGC2, that the SIP UA can be served by MGC1 or MGC4 and that the MGCP MGW can be controlled by MGC1 or MGC3. On this basis, the IRS can learn the respective interconnection state concurrently. In the same way, the peripheral areas of MGC2, MGC3 and MGC4 are distributed over the respective remaining MGCs.

The function of the IRS can itself be interpreted as redundant in the case of geographical redundancy. In the simplest case, this can be done through the mere presence of a redundant system which is addressed by the internal switching centers. If the primary IRS fails in the simplest case, the redundant party can undertake the task of the primary one within a short time on the basis of the self-learning of the interconnection. To this end, the internal switching centers MGC merely need to know that there is a redundant IRS. Alternatively, it is also possible to perform the mutual updates for the transient states between the redundant IRSs. Similarly, it is also possible to implement load sharing mode for the two IRSs.

The invention claimed is:

1. A method for self-configuration of a virtual switching system which is formed from a plurality of switching systems and at least one central entity, comprising:
   prompting at least one of the plurality of switching systems, with an incoming call allocated thereto, to make a routing decision for a desired destination;
   if the desired destination is not known to the allocated switching system, interrogating the at least one central entity about at least one other switching system, and the at least one central entity returns a piece of information about the at least one other switching system based on a topology criteria and the call is set up to and handled by the at least one other switching system; and
   in the instance of failure, interrogating the at least one central entity and the at least one central entity uses information carried in the call to identify the self-induced misallocation of the at least one other switching system and corrects the self-induced misallocation of the at least one other switching system based on a topology criteria and makes a repeat attempt via the remaining plurality of switching systems until at least one of the plurality of switching systems is found to be competent.

2. The method as claimed in claim 1, wherein the desired destination is a called subscriber in the virtual switching system or a connecting line to a further switching system outside of the virtual switching system.

3. The method as claimed in claim 1, wherein the topology criteria includes topology information from the virtual switching system including envisaged allocations of a subscriber or a connecting line to internal switching nodes.

4. The method as claimed in claim 1, wherein the piece of information carried in the call is in the form of a call identification number which is unique in the virtual switching system.

5. An apparatus for self-configuration of a virtual switching system, comprising:
   a plurality of switching systems and at least one central entity, wherein a first of the plurality of switching systems makes a routing decision for a desired destination when a call is incoming;
   the first of the plurality of switching systems, if the desired destination is not known to it, interrogates the at least one central entity about a second one of the plurality of switching systems, and the central entity returns a piece of information about the second of the plurality of switching systems based on a topology criteria and the first of the plurality of switching systems sets up the call to the second of the plurality of switching systems, where it the call is handled; and
   in the instance of failure, the second of the plurality of switching systems interrogates the at least one central entity, and the at least one central entity uses information carried in the call to identify a self-induced misallocation of the second of the plurality of switching systems and corrects the self-induced misallocation of the second of the plurality of switching systems based on the topology criteria and makes another attempt via the remaining plurality of switching systems until a competent switching system is found.

6. The apparatus as claimed in claim 5, wherein the at least one central entity is in the form of a sub-function of an STP server or in the form of a standalone SIP redirect server and is part of the virtual switching system.

7. The apparatus as claimed in claim 5, wherein numbering of a port in the virtual switching system incorporates a number of internal switching systems.

8. The apparatus as claimed in claim 5, wherein the at least one central entity uses a call ID to identify whether it has previously allocated an internal switching system which is to be engaged at one end for an incoming call, and then flags the allocation as incorrect and outputs an alternative allocation based on the topology criteria.

9. The apparatus as claimed in claim 5, wherein if the at least one central entity does not receive a report about an instance of failure after a corrected misallocation, then the at least one central entity updates allocation tables based on the correction for new allocations.

10. The apparatus as claimed in claim 5, wherein the virtual switching system has geographical redundancy.

11. The apparatus as claimed in claim 10, wherein call-processing data of each subscriber and of each connecting line are present in at least two internal switching centers in the virtual switching system which are at geographically different locations, and the associated topology information is available to the at least one central entity as a criterion.

12. The apparatus as claimed in claim 10, wherein the at least one central entity is in redundant form and can be used by internal switching systems in the virtual switching system to decide internal routing.

13. The apparatus as claimed in claim 5, wherein the at least one central entity uses a call-processing signaling protocol to communicate with each of the plurality of switching systems from a plurality of the internal switching systems.

14. The apparatus as claimed in claim 5, wherein a call-processing protocol used by the at least one central entity is one of the standardized protocols SIP, BICC or #7.

15. The apparatus as claimed in claim 5, wherein in the instance of external #7 signaling the virtual switching system has a standard external signaling point code and comprises an internal signaling transfer point via which the external #7 signaling is routed.

16. The apparatus as claimed in claim 15, wherein the at least one central entity is formed in a dedicated device in the virtual switching system or is part of the internal signaling transfer point.

* * * * *